(12) United States Patent
Swanson

(10) Patent No.: US 11,327,977 B2
(45) Date of Patent: May 10, 2022

(54) METHOD FOR DISTRIBUTING MEDIA

(71) Applicant: Swanson International, Inc., Huntersville, NC (US)

(72) Inventor: Ryan B. Swanson, Huntersville, NC (US)

(73) Assignee: SWANSON INTERNATIONAL, INC., Huntersville, NC (US)

( * ) Notice: Subject to any disclaimer, the term of this patent is extended or adjusted under 35 U.S.C. 154(b) by 548 days.

(21) Appl. No.: 16/303,239

(22) PCT Filed: Nov. 19, 2018

(86) PCT No.: PCT/US2018/061786
§ 371 (c)(1),
(2) Date: Apr. 3, 2019

(87) PCT Pub. No.: WO2019/112784
PCT Pub. Date: Jun. 13, 2019

(65) Prior Publication Data
US 2021/0342355 A1    Nov. 4, 2021

Related U.S. Application Data

(60) Provisional application No. 62/594,212, filed on Dec. 4, 2017.

(51) Int. Cl.
*G06F 16/00* (2019.01)
*G06F 16/2457* (2019.01)
(Continued)

(52) U.S. Cl.
CPC ...... *G06F 16/24575* (2019.01); *G06F 16/248* (2019.01); *G06F 16/2428* (2019.01);
(Continued)

(58) Field of Classification Search
CPC ............... G06F 16/335; G06F 16/958; G06F 17/30699; G06F 17/3089; G06F 21/128;
(Continued)

(56) References Cited

U.S. PATENT DOCUMENTS 7,505,923 B1   3/2009   Yoshioka
8,296,380 B1   10/2012  Kelly et al.
(Continued)

OTHER PUBLICATIONS

European Patent Office; Extended European Search Report including the supplementary European Search Report and the European Search Opinion cited in EP 18885961.5 dated Jul. 15, 2021; 10 pages.
(Continued)

*Primary Examiner* — Dinku W Gebresenbet
(74) *Attorney, Agent, or Firm* — Shumaker, Loop & Kendrick, LLP

(57) ABSTRACT

A method of distributing content to consumers may include providing a server loaded with a computer code having an administrator user interface, a franchisor user interface, a franchisee user interface; a library of content accessible by an administrator, a franchisor, and/or one or more franchisees; and a consumer data bank. The method may further include linking the server with social media platforms, populating the library with a plurality of pieces of content, linking the content with a franchise unit location, and publishing the content to a social media account. A further step may include collecting consumer data and storing the consumer data in the consumer data bank. The franchisor and each franchisee may have access to the library of content and to consumer data.

27 Claims, 20 Drawing Sheets

(51) Int. Cl.
    *G06F 16/955* (2019.01)
    *G06F 16/242* (2019.01)
    *G06F 16/28* (2019.01)
    *G06F 16/248* (2019.01)
    *G06Q 50/00* (2012.01)
(52) U.S. Cl.
    CPC .......... *G06F 16/282* (2019.01); *G06F 16/955* (2019.01); *G06Q 50/01* (2013.01)
(58) Field of Classification Search
    CPC ............. G06F 21/6272; G06F 16/2428; G06F 16/24575; G06F 16/248; G06F 16/282; G06F 16/955; G06Q 50/01; G06Q 30/02
    See application file for complete search history.

(56) References Cited

U.S. PATENT DOCUMENTS 9,002,858 B1* 4/2015 Dassa ................ G06Q 30/0202
                                                    707/750
2002/0059364 A1* 5/2002 Coulthard ............. G06F 21/128
                                                    709/203
2011/0145064 A1  6/2011 Anderson et al.
2015/0227967 A1  8/2015 Bojan

OTHER PUBLICATIONS

Lenser: "Manage & Publish Your Team's Social Images with Sprout's Asset Library"; Oct. 6, 2016; retrieved from <https://sproutsocial.com/insights/image-asset-library/> entire document; 6 pages.
Vivial: "How to Implement Franchise Social Medial at the Local Level"; Apr. 14, 2015; retrieved from <https://vivial.net/blog/local-franchise-social-media/> entire document; 12 pages.
International Search Reporting and Written Opinion of corresponding International Application No. PCT/US2018/061786 dated Feb. 11, 2019; 18 pages.

* cited by examiner

Fig. 8

Screen of the locations linked to their corresponding social media platform

Screen of all franchise locations assigned to one franchisee (the user)

METHOD FOR DISTRIBUTING MEDIA

CROSS REFERENCE TO RELATED APPLICATION

This application claims priority to International Application No. PCT/US18/61786 filed on Nov. 19, 2018 and U.S. Provisional Application No. 62/594,212 filed on Dec. 4, 2017, the entire contents of each are hereby incorporated by reference in the entirety.

TECHNICAL FIELD AND BACKGROUND OF THE INVENTION

Social media may generally be defined to include websites and applications that enable users to create and share content or to participate in social networking. Social media has rapidly become an online environment where users interact with one another and consume media content provided or shared by other users and by commercial entities.

Social media exists across an ever-expanding list of social media platforms including Facebook, Twitter, LinkedIn, Google+, YouTube, Pinterest, Instagram, Tumblr, Flickr, Reddit, Snapchat, WhatsApp, Quora, Vine, Periscope, Bizsugar, StumbleUpon, Delicious, Digg, Viber, Meetup, Google My Business and VK.

Commercial entities have traditionally published content, such as advertisements, articles, and announcements via television, radio, billboards, and other print media. However, as consumers migrate away from traditional media and towards social media, commercial entities have struggled to keep pace and have struggled to supply requisite content across the rapidly expanding list of social media platforms. These struggles are especially acute where the commercial entity has a diversified hierarchical or tiered structure where there may be content provided at multiple levels within the commercial entity. Likewise, the struggles are acute with respect to a franchisor/franchisee relationship where a franchisor and/or its franchisee may desire to publish content to the public.

Traditionally, franchisees and franchisors have shared "best practices" with regards to proven marketing techniques. However it is currently challenging, if not impossible, for sharing, comparing and reusing social media content across a brand. The ability to view analytical data on various social media content across a brand such as how fast franchisees are responding to online reviews and how responding (and the speed of response) to reviews results in reviewers changing their review score is valuable across a brand. The ability to view this analytical data and repost successful social media content such as campaigns that are customized to the various locations owned by a franchisee does not exist.

Thus, there is a need in the art for a method of distributing content to consumers across multiple social media platforms where a commercial entity may include a franchisor/franchisee or other diversified hierarchical or tiered structure while also making this content available to analyze and reuse as original content.

SUMMARY OF THE INVENTION

In one aspect, embodiments of the inventive concepts disclosed herein are directed to a method of distributing content to consumers. One step includes providing a server loaded with a computer code. The computer code may include an administrator user interface, a franchisor user interface, a franchisee user interface. The code may further include a library of content accessible by an administrator, a franchisor, and/or one or more franchisees. The computer code may further include a consumer data bank. Another step according to the method may include linking the server with a plurality of social media platforms. Another step according to the method may include populating the library with a plurality of pieces of content. Another step according to the method may include linking one piece of content of the plurality of pieces of content to a franchise unit location and adding a location signature, associated with the franchise unit location, to the one piece of content. Another step according to the method may include publishing the one piece of content in one or more social media accounts of the plurality of social media platforms. Another step according to the method may include collecting consumer data for the one piece of content by the server and storing the consumer data in the consumer data bank. According to such a method, the franchisor and each franchisee may have access to the library of content and to consumer data.

In a further aspect, an additional step may include linking the one piece of content with a second franchise unit location and adding a second location signature, associated with the second franchise unit location, to the one piece of content.

In a further aspect, an additional step may include providing the franchisor with an authorization to link the one piece of content of the plurality of pieces of content to the franchise unit location, to add the location signature, associated with the franchise unit location, to the one piece of content, and to publish the one piece of content in one or more social media accounts of the plurality of social media platforms.

In a further aspect, an additional step may include providing one of the franchisees who controls the franchise unit location with authorization to link the one piece of content of the plurality of pieces of content to the franchise unit location, to add the location signature, associated with the franchise unit location, to the one piece of content, and to publish the one piece of content in one or more social media accounts of the plurality of social media platforms.

In a further aspect, when a franchisor publishes franchisor content to a franchisor social media account, the server may link the franchisor content to each franchise unit location; may add the location signature, associated with the franchise unit location, to the franchisor content; and may publish the franchisor content in social media accounts associated with each franchise unit location.

In a further aspect, the franchisor content published in the social media accounts may be associated with each franchise unit location is published as original content.

In a further aspect, the plurality of social media platforms include one or more of: Facebook, Twitter, LinkedIn, Google+, YouTube, Pinterest, Instagram, Tumblr, Flickr, Reddit, Snapchat, WhatsApp, Quora, Vine, Periscope, Bizsugar, StumbleUpon, Delicious, Digg, Viber, Meetup, and VK.

In a further aspect, the franchisor may include a plurality of franchisors and each of the franchisees may be associated with one franchisor of the plurality of franchisors.

In a further aspect, the franchisee user interface may allow each franchisee to view: content in the library, which the franchisee has published, content in the library which other franchisees have published, and content in the library which the franchisor has published; content in the library which the franchisee has scheduled to be published, content in the library which other franchisees have scheduled to be published, and content in the library which the franchisor has scheduled to be published; consumer data; and contact information for each of the franchisees.

In a further aspect, the consumer data may include an impression count, a like count, a comment count, number or people that viewed content, an interaction/engagement rate or other analytical data In a further aspect, the franchisor user interface may allow the franchisor to link multiple franchise unit locations with a single franchisee.

In a further aspect, the franchisee user interface may allow the franchisor to link multiple franchise unit locations with a single franchisee.

In a further aspect, the franchisee user interface may allow the franchisees to link the one or more social media accounts to a particular franchise unit location.

In a further aspect, the franchisor user interface may allow the franchisor to link one or more social media accounts to a particular franchise unit location.

In a further aspect, the franchisee user interfaces may allow the franchisee to customize the location signature to correlate with a particular social media account.

In a further aspect, the franchisee user interface may allow the franchisee to apply an organizational hierarchy of end users wherein the franchisee can control content available for end users to publish.

In a further aspect, the consumer data may be viewable on an analytics hub by franchisors via the franchisor user interface and/or by franchisees via the franchisee user interface.

In a further aspect, when a first franchisee publishes a first franchisee content to a first franchisee social media account, the server links the first franchisee content to a second franchise unit location controlled by a second franchisee; replaces a first location signature with a second location signature, associated with the second franchise unit location; and publishes the first franchisor content in social media accounts associated with the second franchise unit location.

In a further aspect, the first franchisee content published in the social media accounts associated with the second franchise unit location is published as original content.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 8 is an exemplary screen shot;
FIG. 9 is an exemplary screen shot;
FIG. 10 is an exemplary screen shot.

DETAILED DESCRIPTION OF EXEMPLARY EMBODIMENTS

Figure 1:
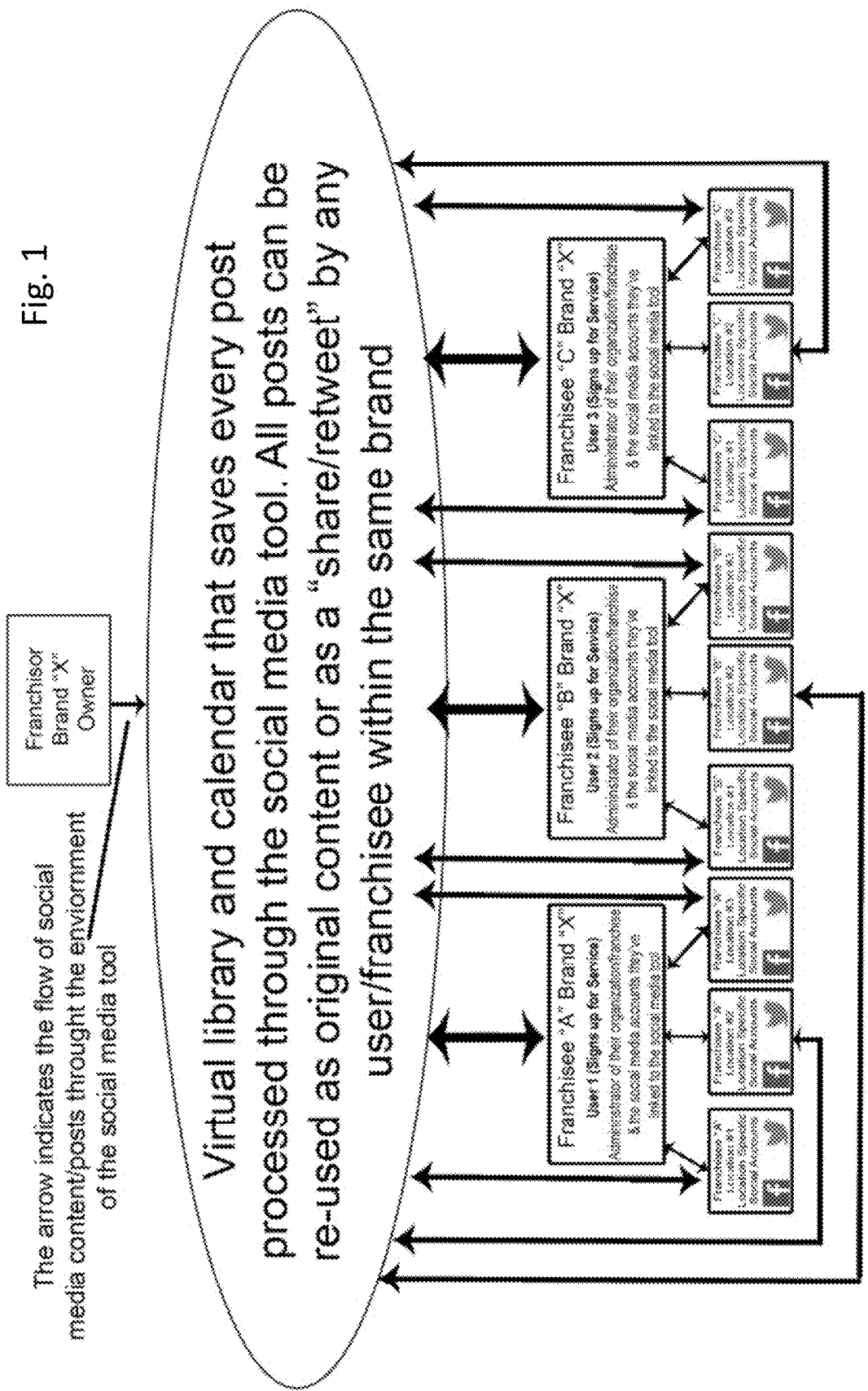
FIG. 1 is a flow chart.

The inventive concepts are described hereinafter with reference to the accompanying drawings in which exemplary embodiments are shown. However, the inventive concepts maybe embodied in many different forms and should not be construed as limited to the representative embodiments set forth herein.

The inventive concepts disclosed herein are generally directed to a method for publishing content, originating at one or more different levels of a hierarchal commercial entity, across multiple different social media platforms.

As used herein, a hierarchal commercial entity may include a parent company (individual person, sole proprietor, partnership, limited liability company, corporation, or any other association, religion, organization, or jural entity) which owns multiple other companies. As an example, The Walt Disney Company currently owns Lucasfilm Ltd. and ESPN, Inc. among others. Alternatively, a hierarchal commercial entity may include a company, which owns multiple brands. As an example, The Coco-Cola Company currently owns Sprite, Diet Coke, and Fanta, among others. Alternatively, as used herein, a hierarchal commercial entity may not be commercial but may comprise religious or non-profit entities.

Alternatively, a hierarchal commercial entity may include a franchisor/franchisee structure. As an example, McDonald's Corporation is a franchisor, which sells authorized franchise unit locations to franchisees that operate the particular unit locations. In some situations, the franchisor may also own some, none, or all of the franchises. In other situations, one or more third parties may own the franchises. One of skill in the art will recognize that there are various different forms of hierarchal entity structures and one or more structures maybe combined into various hybrid structures. In order to best express the inventive concept of the present invention, this description will primarily address the franchisor/franchisee type of structure but one of skill in the art will recognize that various others of the hierarchal commercial entity structures could be equally employed according to this inventive concept without deviating from the inventive concept.

As used herein, social media platform is not limited to but may include Facebook, Twitter, LinkedIn, Google+, Google My Business, YouTube, Pinterest, Instagram, Tumblr, Flickr, Reddit, Snapchat, WhatsApp, Quora, Vine, Periscope, Bizsugar, StumbleUpon, Delicious, Digg, Viber, Meetup, and VK.

According to the inventive concept disclosed herein, a computer server is loaded with code which facilitates the publishing of content to social media platforms by franchisees and franchisors. A franchisee, who has a relationship with a franchisor, may publish content to one or more social media platforms, via a location specific to a social media account. The content may be audio, video, photographs, print, text, or other visual imagery. The content may be stored in a virtual library housed on a server. A franchisor or a franchisee may place the content in the virtual library.

According to the inventive concept, any content shared or published by a franchisee or a franchisor is automatically stored in the virtual library and is available for publishing or re-publishing by any other franchisee or the franchisor. In alternate embodiments, when a franchisor publishes content, if a franchisee so elects, the content will automatically be published onto the social media platforms and respective social media accounts selected by the franchisees. When a franchisee publishes content, a signature will be added which is specific to the franchise unit location. In a further alternate embodiment, franchises operating under the same brand and/or a franchisor can link together so they can receive automatic re-publication as original content from each other.

In an exemplary embodiment, FIG. 1 shows a flow chart featuring a franchisor as the owner of Brand "X". The franchisor has access to the virtual library of content as do the franchisees "A", "B", and "C". As shown in FIG. 1, each of the franchisees A, B, and C own individual franchise unit locations 1, 2, and 3. For each franchise unit location, there is a separate social medial account. As used herein, the term "franchise unit location" may refer to an actual brick and mortar location or it may refer to a website, printed periodical, television or radio channel, or other virtual location. Each franchisee links to particular social media accounts. FIG. 1 shows icons for Facebook and Twitter but other social media platforms are included in the inventive concept. Thus, according to the present inventive concept, if the franchisor publishes content, it is stored in the virtual library.

The content may be published, either at the express direction of the franchisees or automatically, to the social media accounts for each discrete franchise unit location. Likewise, according to the present inventive concept, if franchisee A publishes content to the social media accounts it has linked to each of its franchise unit locations, the content will be saved in the virtual library and may be published, either at the express direction of the other franchisees or automatically, to the social media accounts for each discrete franchise unit location owned and/or operated by the other franchisees. Further, as shown in FIG. 1, via the library/calendar feature, all users have the ability to "look up" future scheduled social media publications and historic social media publications. Within the "Analytics Library" feature franchisors and franchisees are able to filter and view analytics from all franchises on published social media content in order to publish selected content to specified social media platforms. Filtering can be based on location, franchisee, and consumer data. Examples of consumer data include, but are not limited to: average review response time, average review change, average review rating, links to view other franchisees online review pages, total number of online views, total number of engagements of an online review site, average engagement percentage, like count, comment count, re-tweets, and shares. Consumer data can be pulled at pre-selected intervals (daily, weekly, etc.) or in real-time. The users can review their own publications as well as the publications of all other users within the same brand. Additionally, according to the inventive concept, each user can contact other users via contact information provided by the software.

Figure 2:
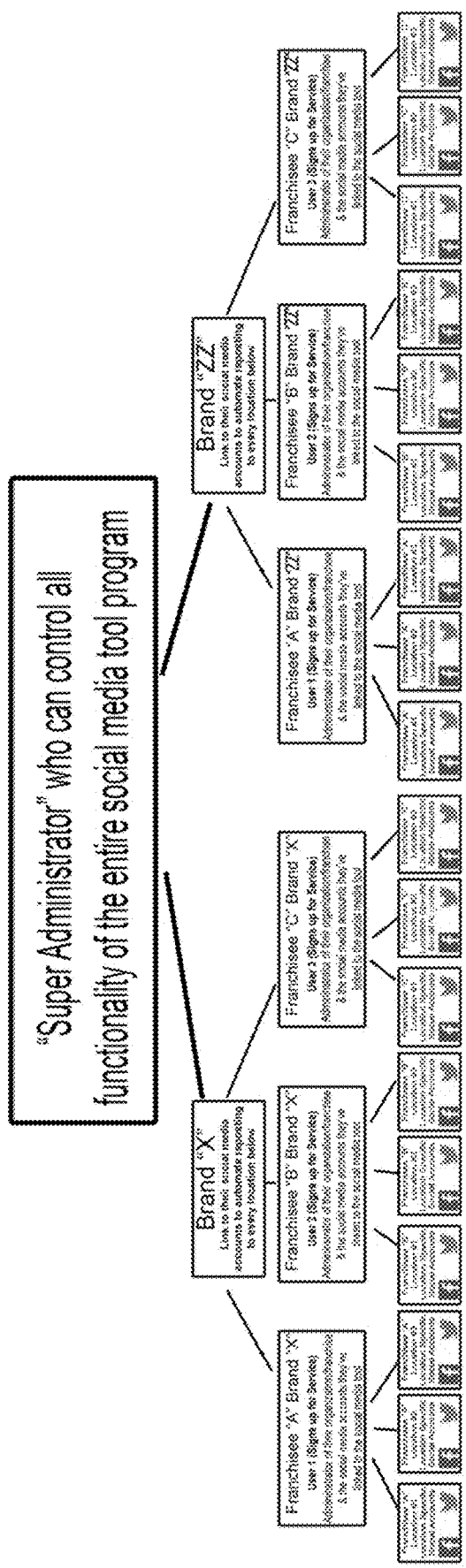
FIG. 2 is a flow chart.

In an exemplary embodiment, FIG. 2 shows an exemplary hierarchal structure as applied to the inventive concept. Here, the method according to the inventive concept includes a top-level administrator of the server and computer code. The top-level administrator is responsible for maintaining the servers and for facilitating the addition of franchisors, e.g., Brand "X" and Brand "ZZ" as shown. Individual franchisees may sign up for the publication service and link their individual social media accounts, which are specific to franchise unit locations. As shown in FIG. 2, an unlimited number of franchisors can be added to the program by individual users selecting to add/start a new brand.

Figure 3:
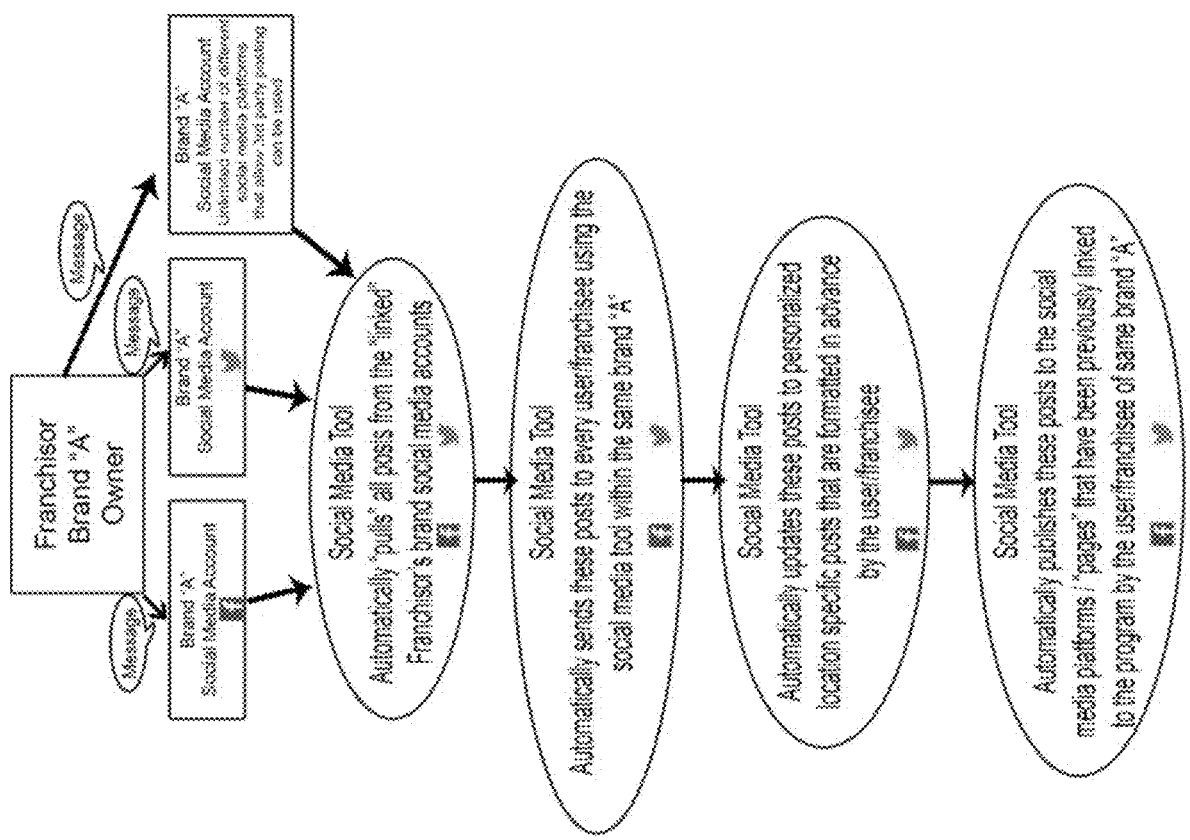
FIG. 3 is a flow chart.

In an exemplary embodiment, FIG. 3 is a flow chart showing automatic sharing and reposting functionality according to the inventive concept. A computer program monitors the official brand's (franchisor) social media account (e.g., Facebook, Twitter) for new content. Once new social media content is published by the franchisor the computer program will either share/retweet or publish as original content all the franchisee's social media accounts operating under the same brand that are using the franchise social media sharing program. As shown in FIG. 3, a franchisor owns Brand "A". The franchisor publishes content to the franchisor's social media accounts (Facebook and Twitter as shown). The computer program according to the inventive concept will automatically pull all posts from the franchisor's social media accounts. This content will be automatically sent via the server to every franchisee who has signed up for the service according to the inventive concept. The server will then personalize the content with franchise unit location specific signatures and will format content for republishing to the individual franchise unit location specific social media accounts.

Figure 4:
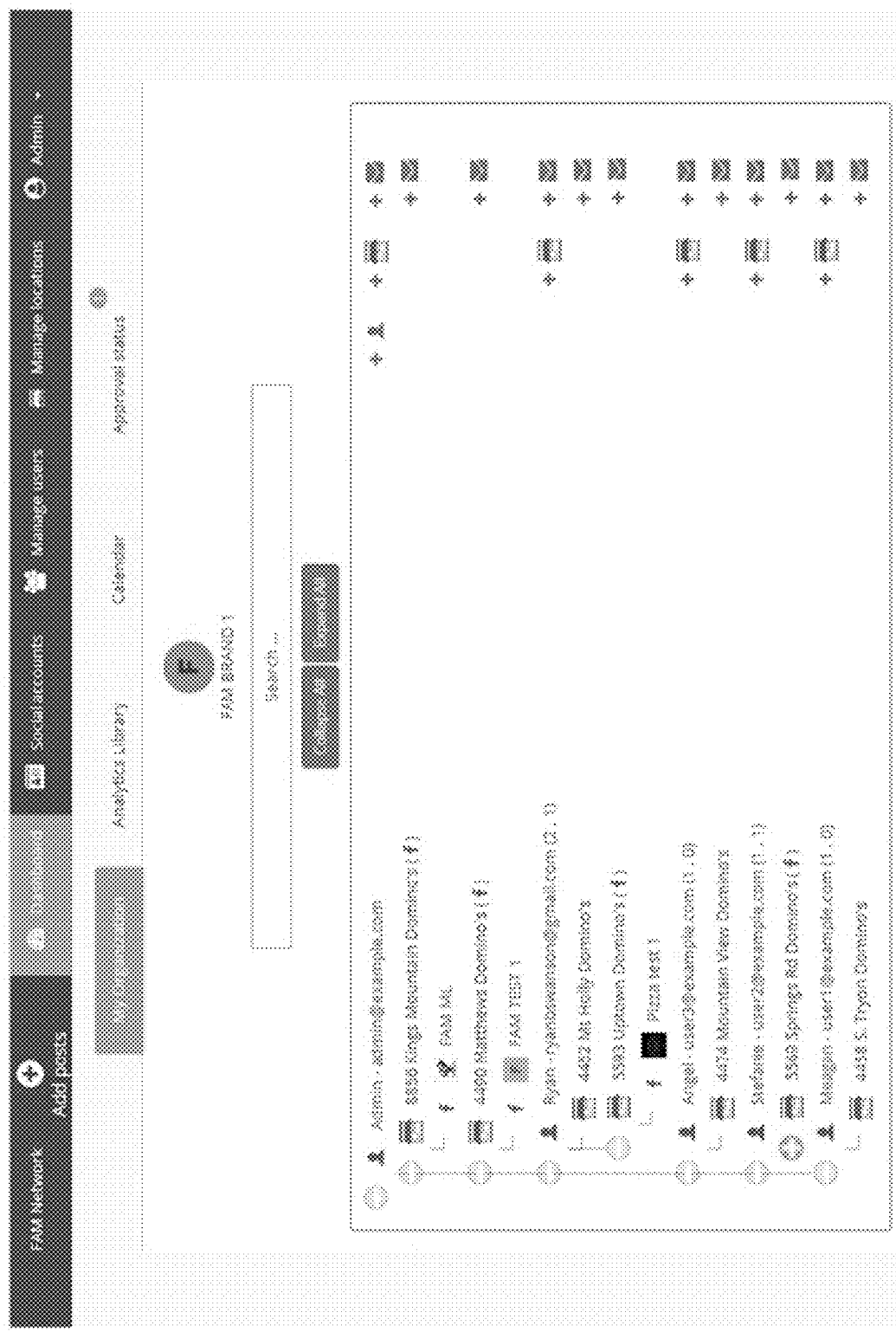
FIG. 4 is an exemplary screen shot.
Figure 5:
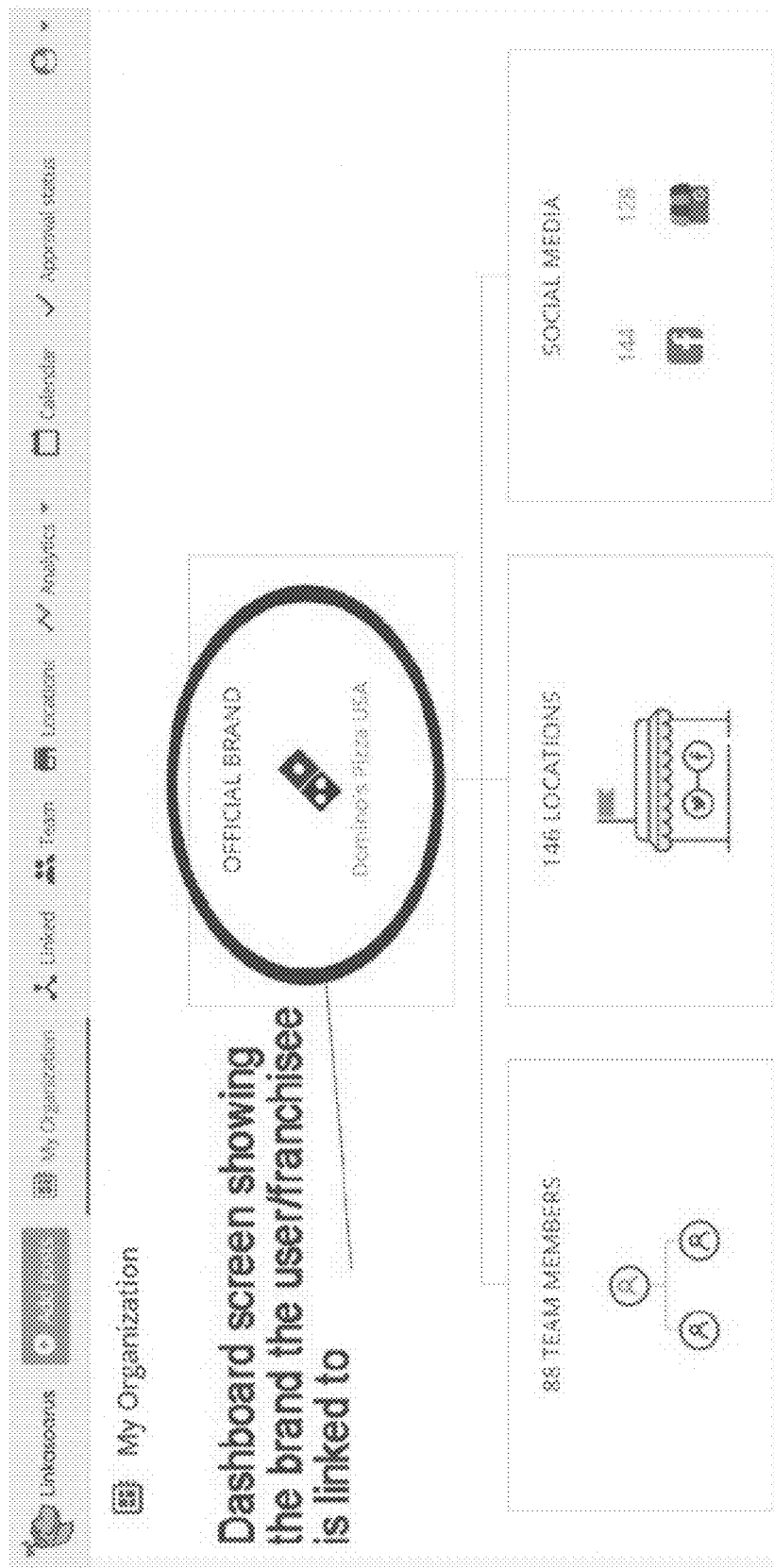
FIG. 5 is an exemplary screen shot.

In an exemplary embodiment, FIG. 4 and FIG. 5 show screenshots of an organizational screen wherein the authority and posting rights of individual users of the computer code may be allocated according to the inventive concept. As shown, each user has franchise unit locations "below" them that they can post social media content to unless the user has been given additional privileges to post "outside" of their hierarchy. Thus, franchisees may control what content and to what specific social media accounts individual users may publish content.

Figure 6:
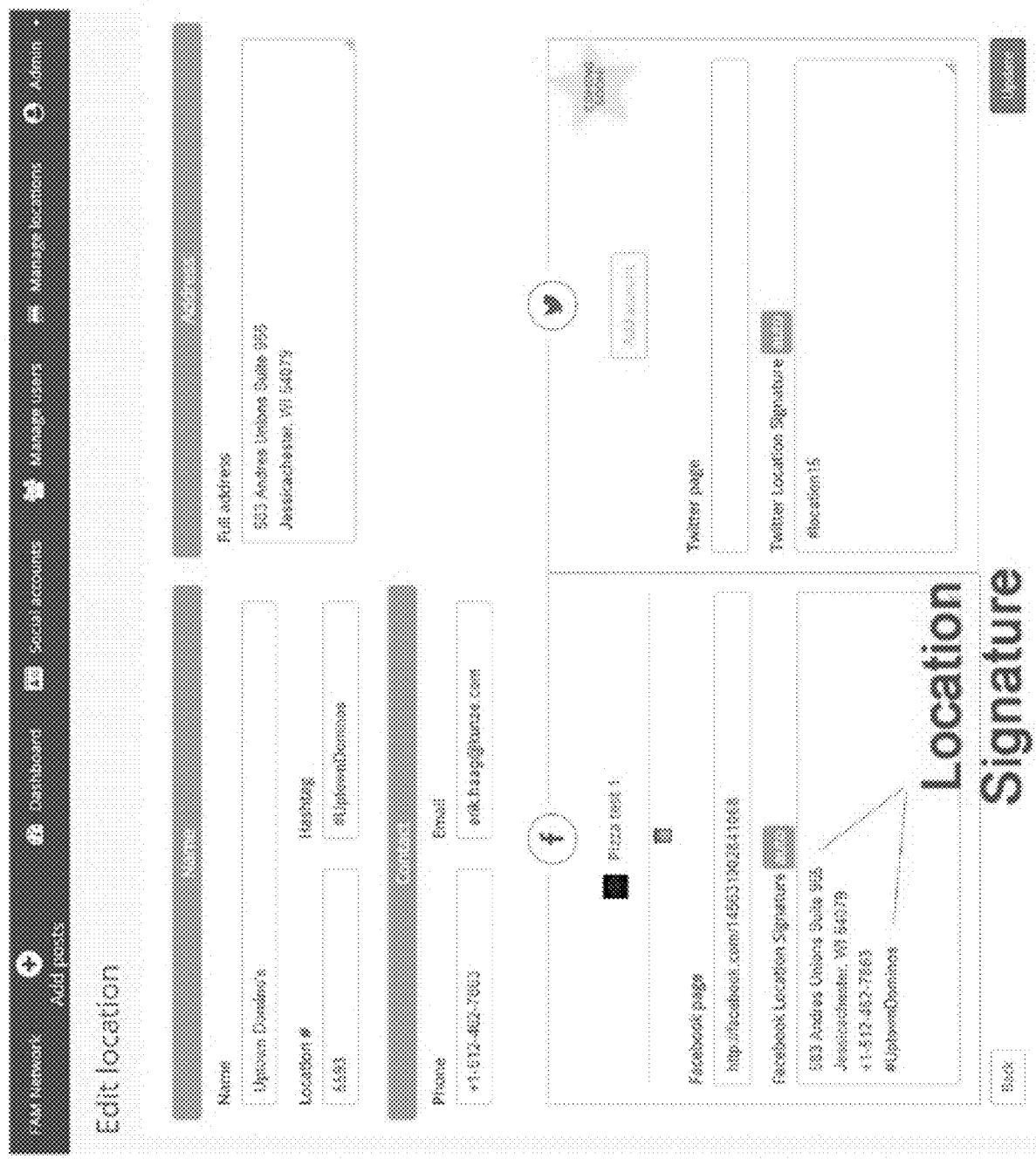
FIG. 6 is an exemplary screen shot.

In an exemplary embodiment, FIG. 6 shows a screenshot of an input and edit screen where a user can upload and/or edit the franchise unit location specific signature. This signature can be customized for each franchise unit location and for each social media platform account linked therewith.

Figure 7:
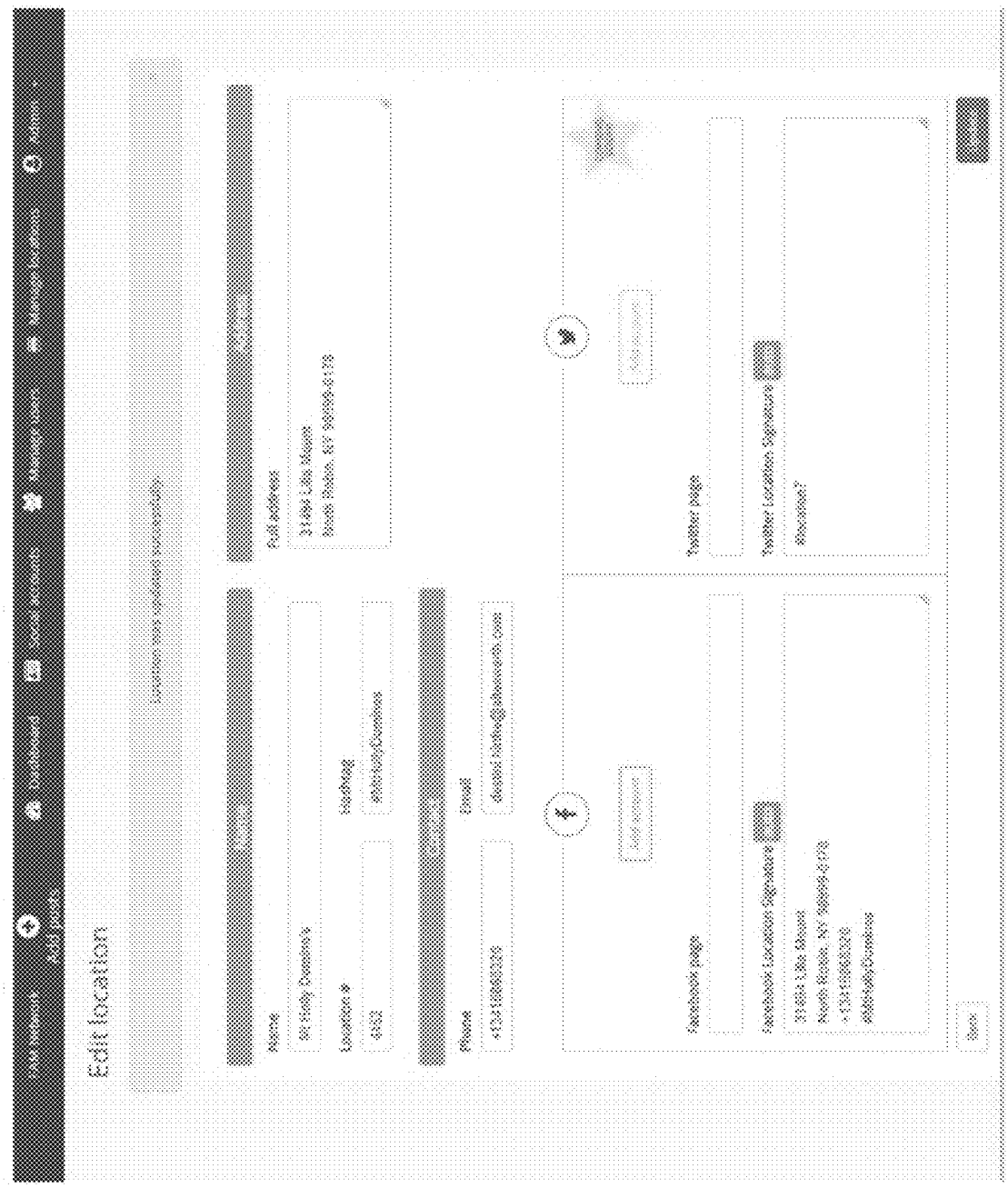
FIG. 7 is an exemplary screen shot.

In an exemplary embodiment, FIG. 7 is comparable to FIG. 6 and shows how a user may be able to add a franchise unit location within the program for each one of their franchise unit locations. This franchise unit location can be used as an automatic location signature added to franchisee replies to comments on social media by consumers.

Figure 8:
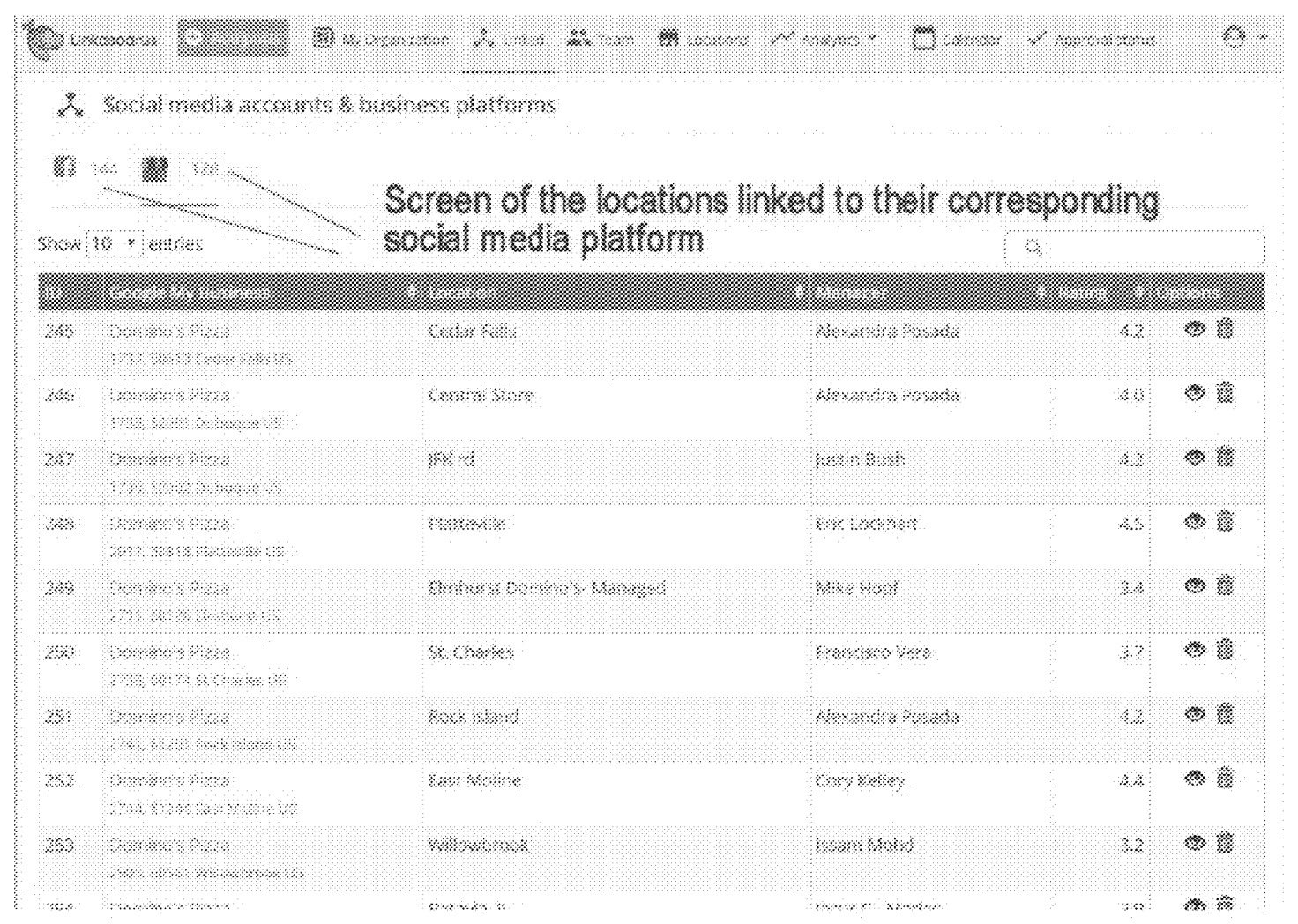

In an exemplary embodiment, FIG. 8 shows a screen of locations linked to their corresponding social media platform under the "Linked" tab. As shown, the user has the option to view a listing of either Facebook or Google My Business linked locations. The screen shown in FIG. 8 has Google My Business selected and shows a list of all linked locations. Other platforms can be listed in addition to the two shown.

Figure 9:
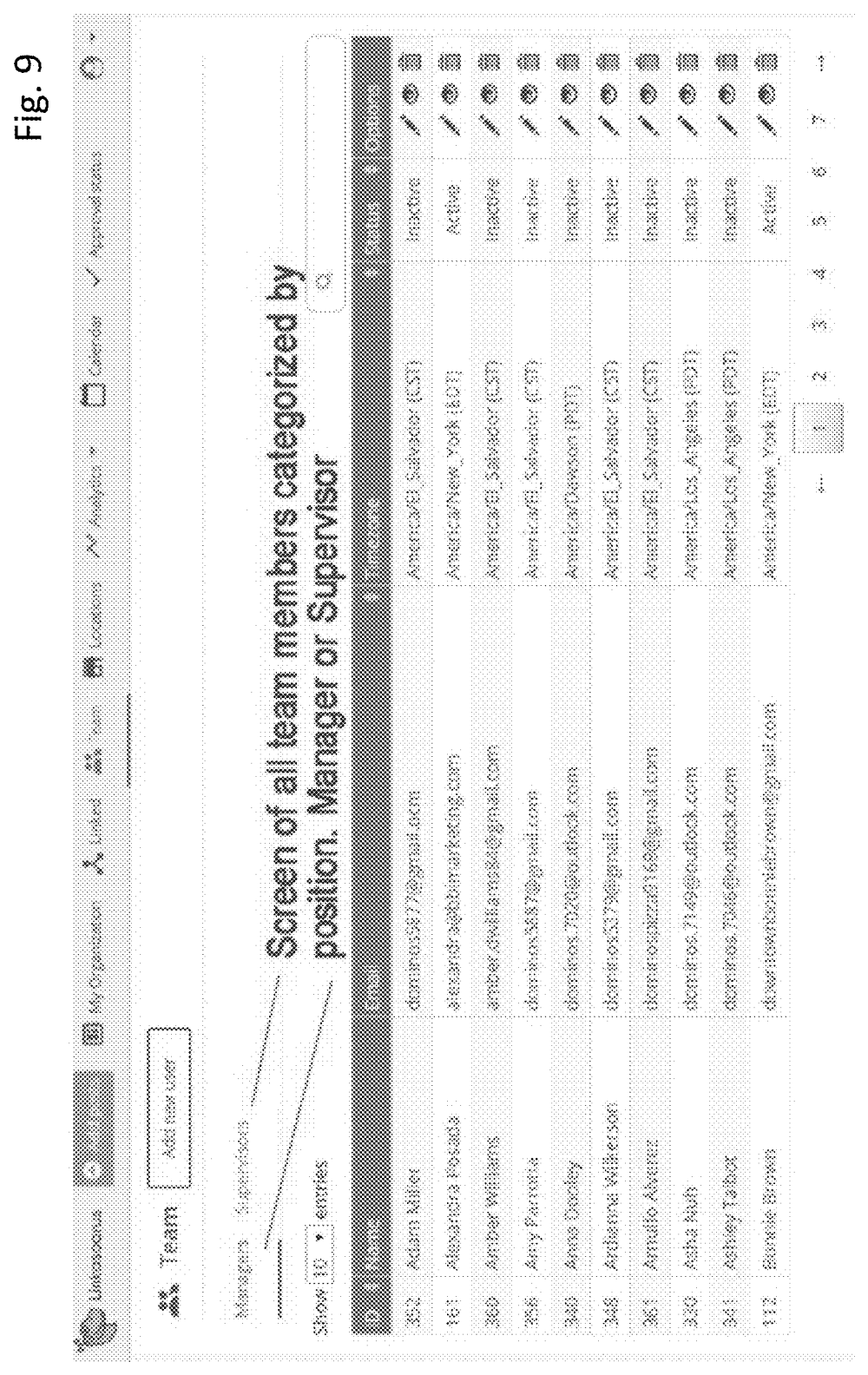

In an exemplary embodiment, FIG. 9 is a screenshot of the "Team" portion of the software. In this "Team" portion, a user and add, view, and edit team members according to their user permissions. The listing of users is divided into managers and supervisors.

Figure 10:
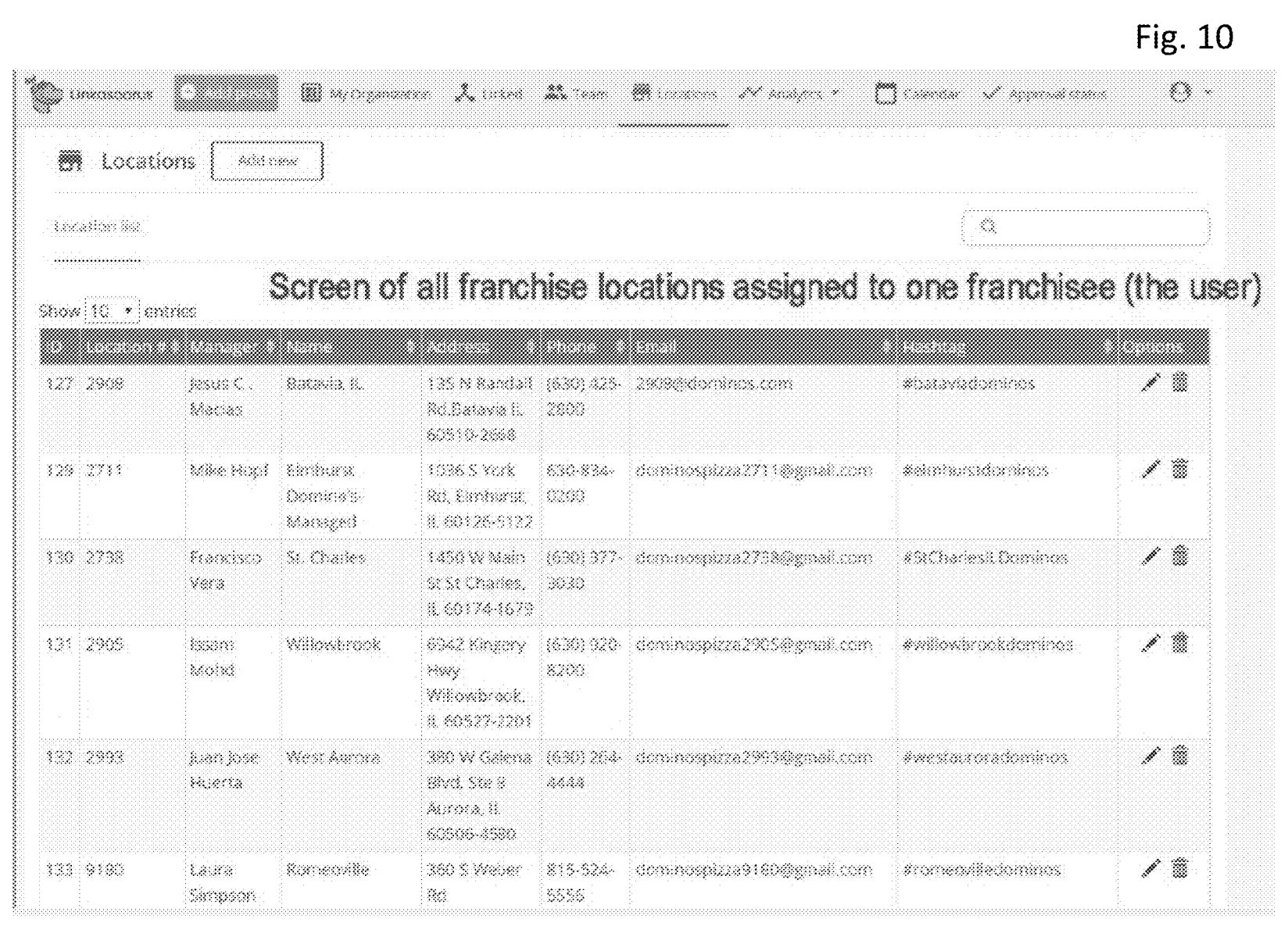

In an exemplary embodiment, FIG. 10 shows a screenshot of the "Locations" portion of the software. A searchable listing of all locations assigned to the current user or the franchisee is displayed. The user is able to add new locations, edit locations, and delete locations.

Figure 11:
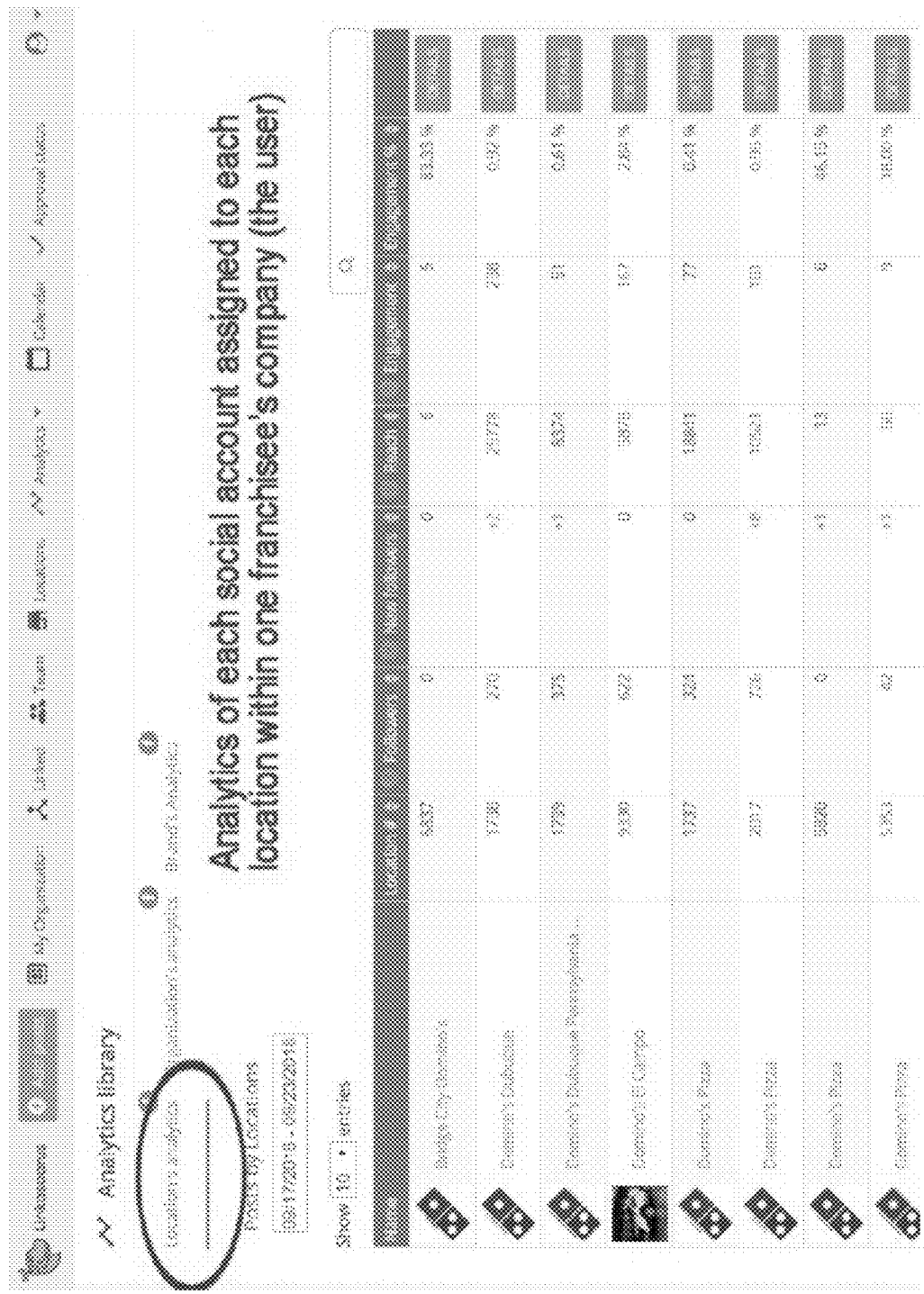
FIG. 11 is an exemplary screen shot.
Figure 12:
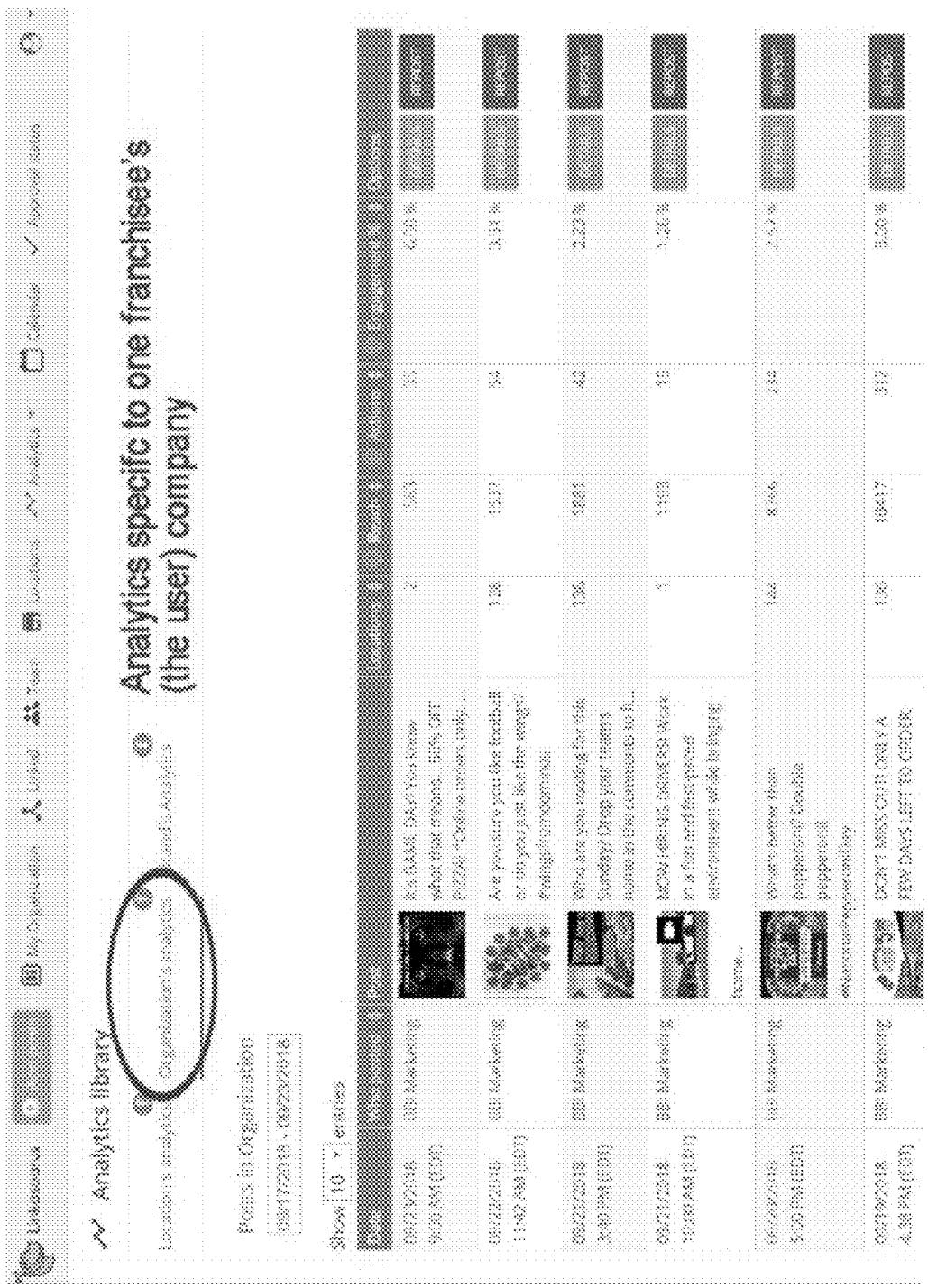
FIG. 12 is an exemplary screen shot.
Figure 13:
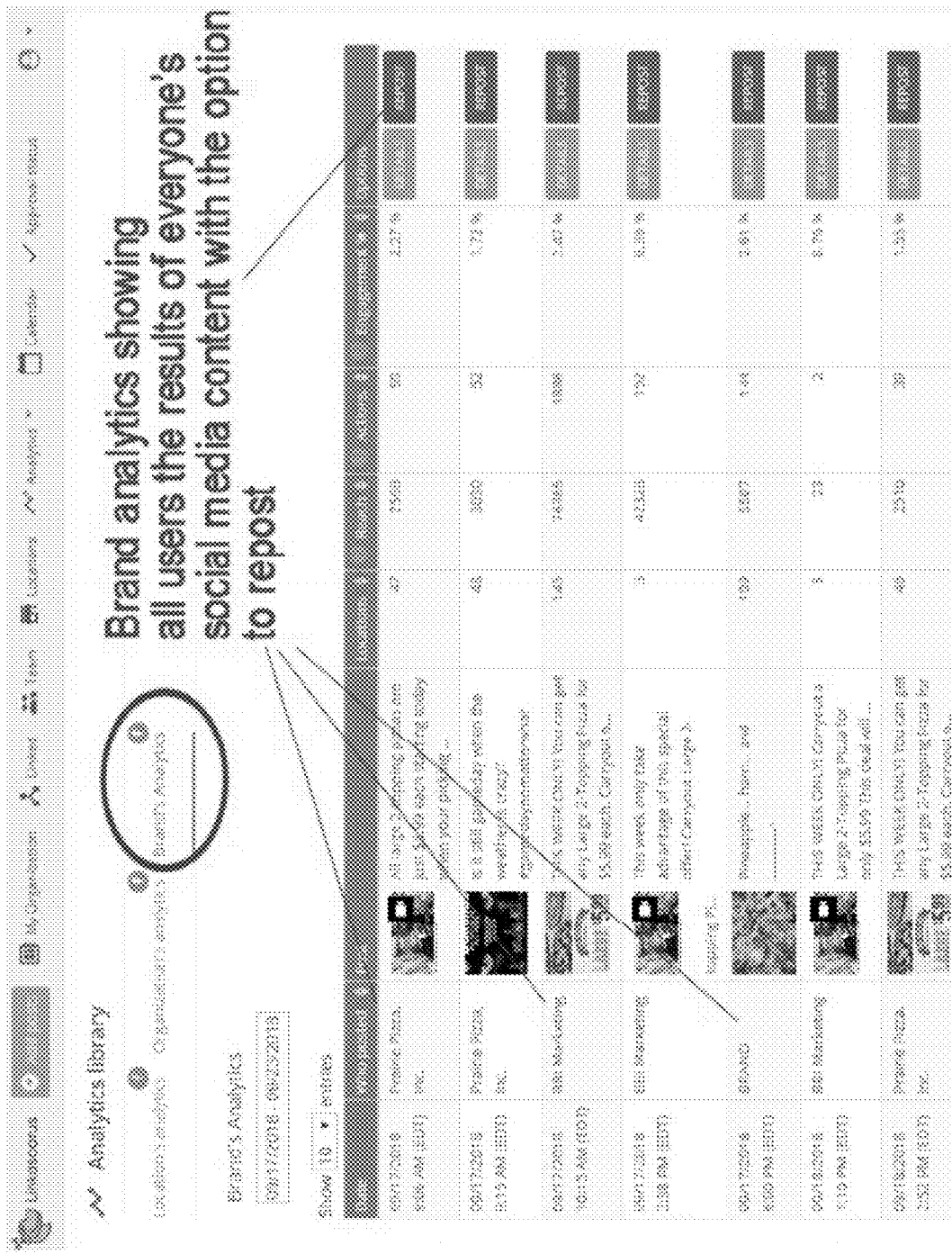
FIG. 13 is an exemplary screen shot.

In an exemplary embodiment, FIGS. 11-13 show the "Analytics" portion of the software. Within the "Analytics" portion, the user has three options to select: "Location's analytics", "Organization's analytics", and "Brand's analytics". FIG. 11 shows a screenshot of the "Location's analytics" where the user can view analytical data for each location of the franchisee. This data can be social media followers, new followers, reach, engagement, and engagement percentage. The data that can be provided is not limited to what is shown in the screenshot. FIGS. 12 and 13 show screenshots of the data with breakdowns for the franchisee's company and for the brand. Other breakdowns are possible, even possible competitor data if and when that data is available for competitive assessment. Each of the views in the "Analytics" portion can have the ability to open more details and repost any listed social media content.

Figure 14:
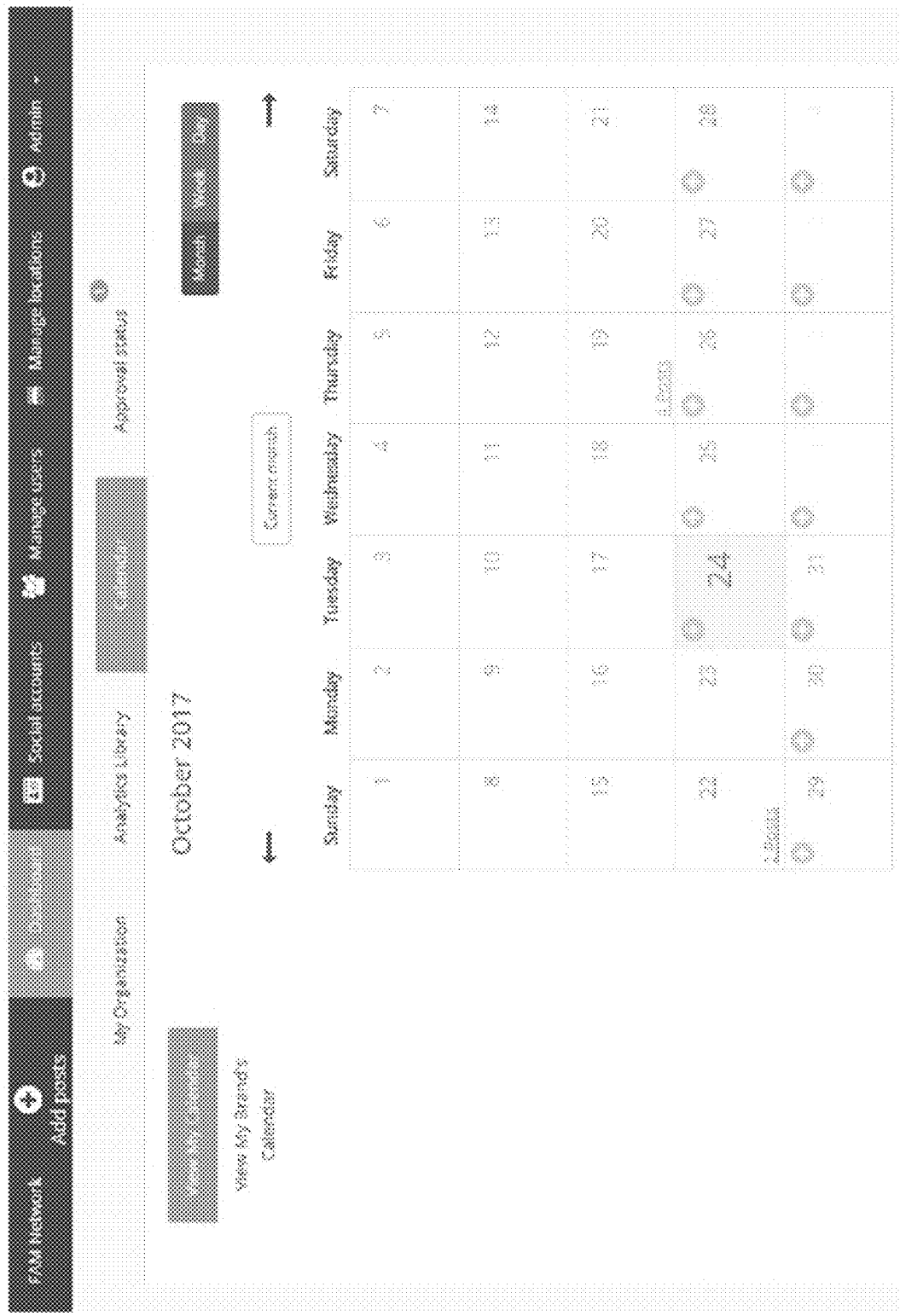
FIG. 14 is an exemplary screen shot.
Figure 15:
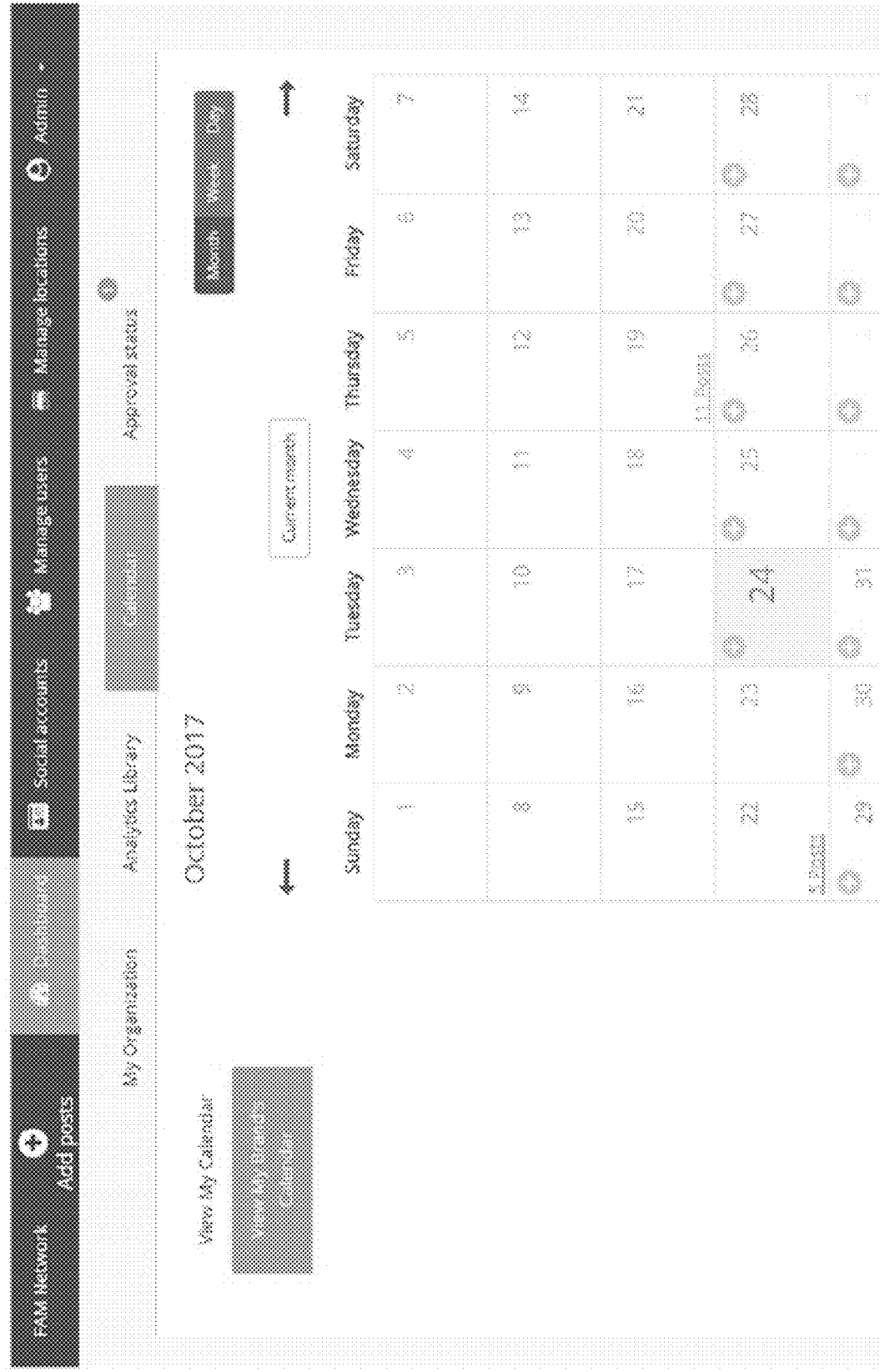
FIG. 15 is an exemplary screen shot.
Figure 16:
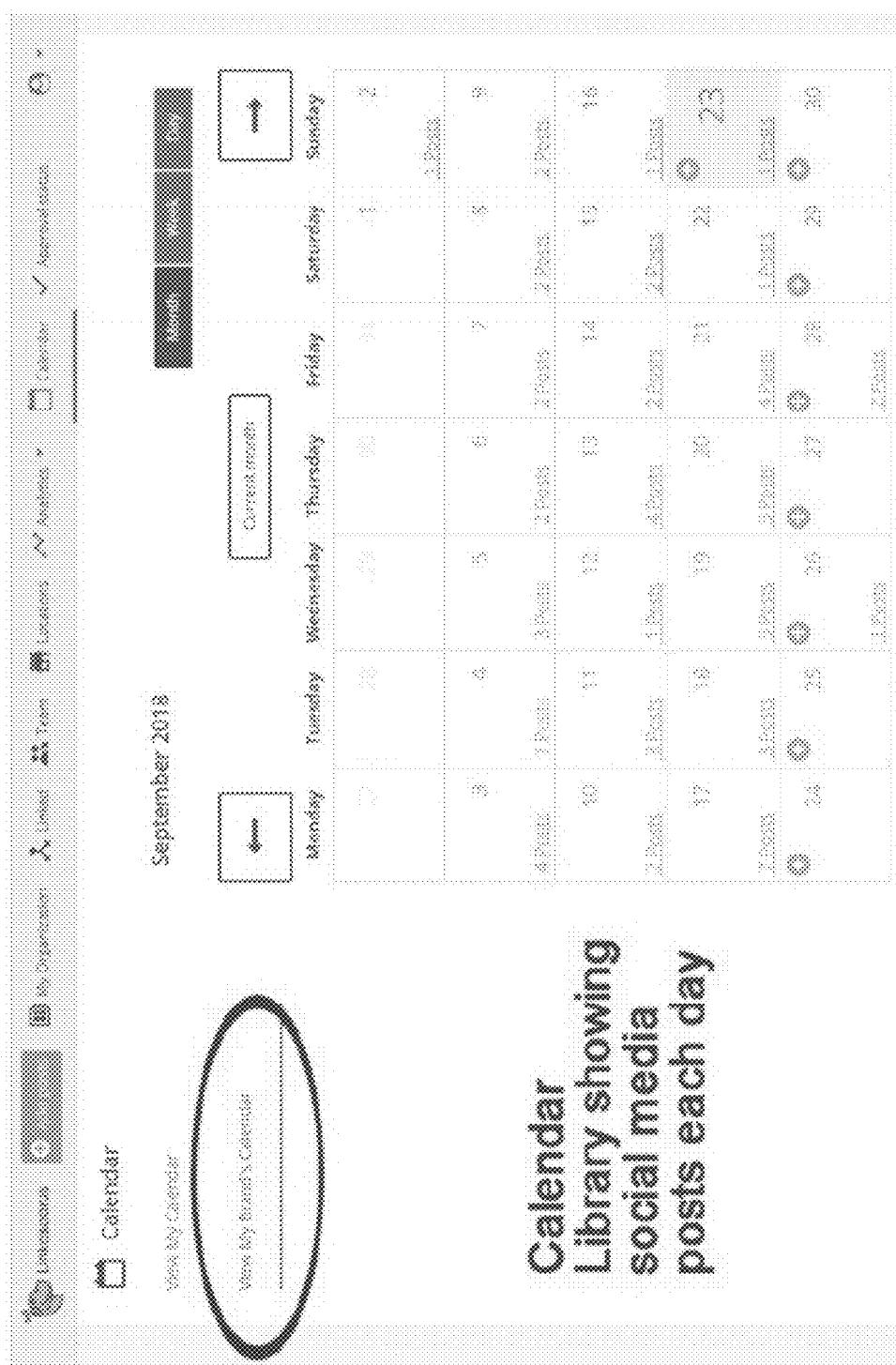
FIG. 16 is an exemplary screen shot.
Figure 17:
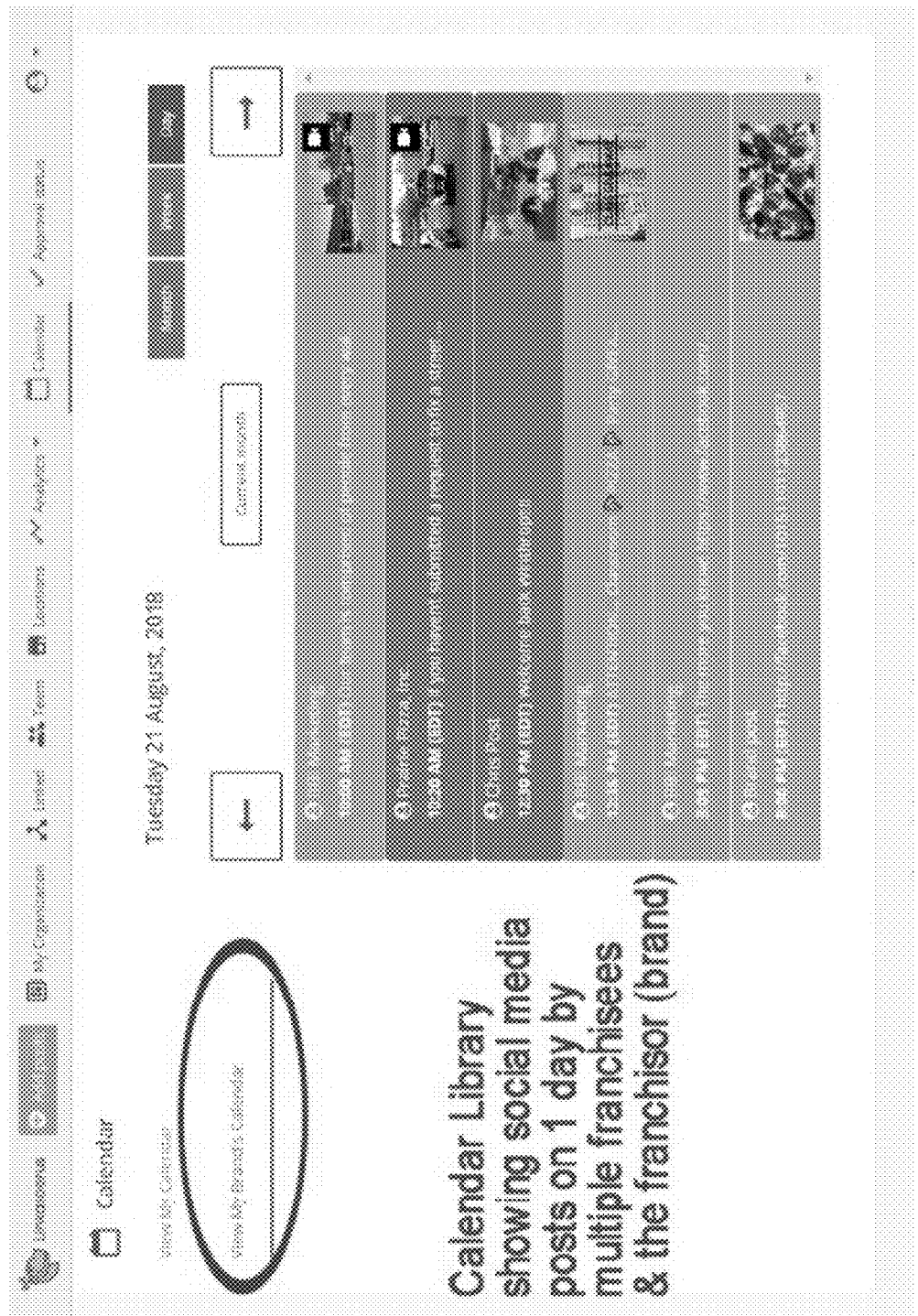
FIG. 17 is an exemplary screen shot.

In an exemplary embodiment, FIGS. 14-17 show screenshots of a calendar view in the software according to the present invention. In particular, FIG. 14 shows a screenshot of a particular franchisee's calendar whereas FIG. 8 shows a screenshot of the entire brand (or franchisor) calendar. As shown in this example, for the same period of time in the screenshots, the "My Brand's Calendar" of FIG. 15 has 11 posts listed for Oct. 19, 2017 where the "My Calendar" of FIG. 14 only has 4 posts for the same day. This is because the "My Brand's Calendar" has multiple users contributing (publishing content) to the program on the same day and the user only has their 4 posts for the same day. FIG. 16 is an alternative view of FIG. 15 showing the "My Brand's Calendar". FIG. 17 is a calendar view for a single day. The day is selected by the user from the calendar view shown in FIG. 14, FIG. 15, or FIG. 16.

Figure 18:
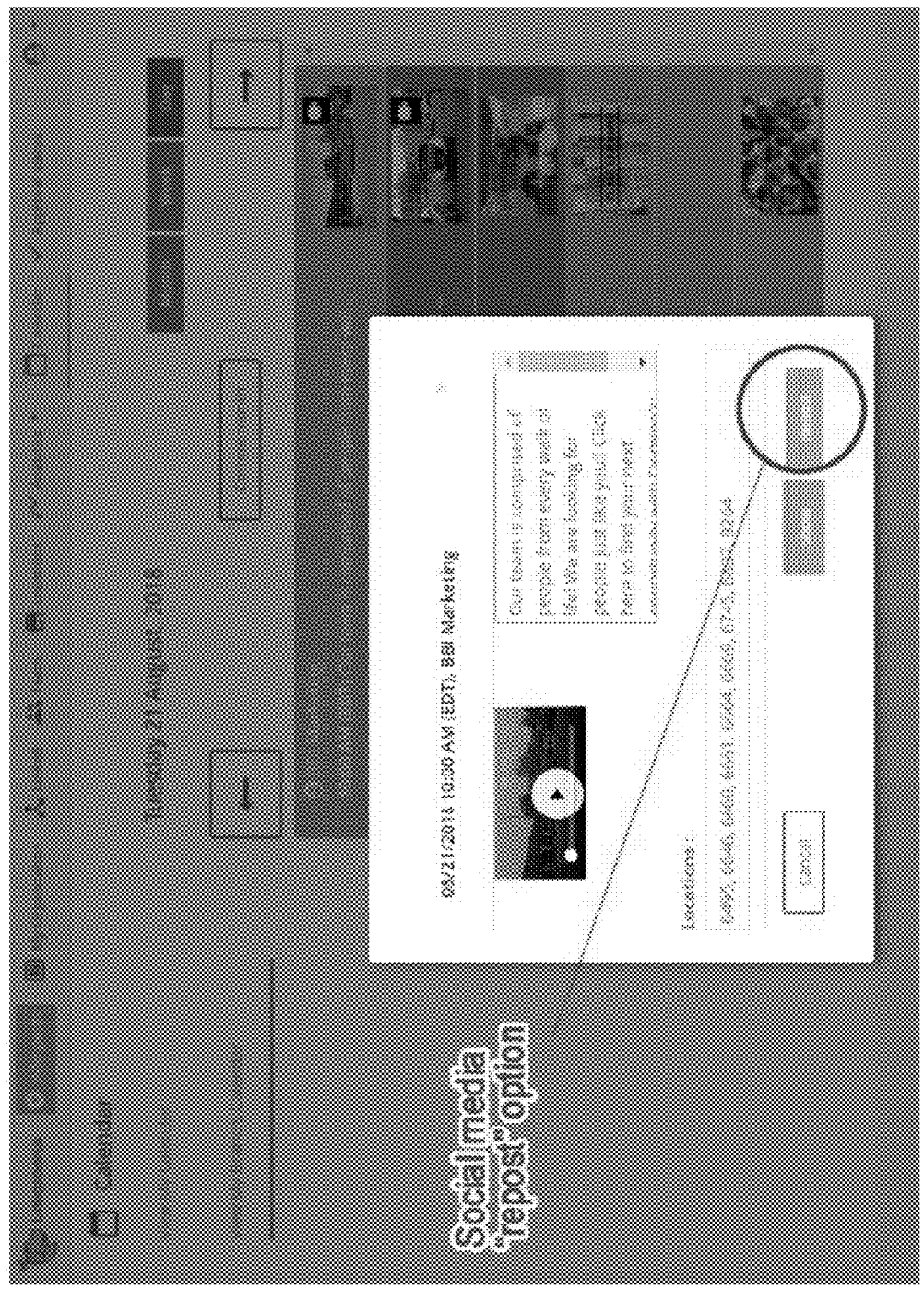
FIG. 18 is an exemplary screen shot.

In an exemplary embodiment, FIG. 18 shows a screenshot of the window for reposting content from the calendar to social media. The user is able to select which content to repost, select the locations where the repost will be made, and edit the text of the post. The software is able to have pre-filled locations and predetermined social media accounts where the reposts are made. These pre-filled locations and predetermined accounts are made by the user in another portion of the software. A franchisee is able to customize the content to the specific location and also schedule a date when the social media content will republish.

Figure 19:
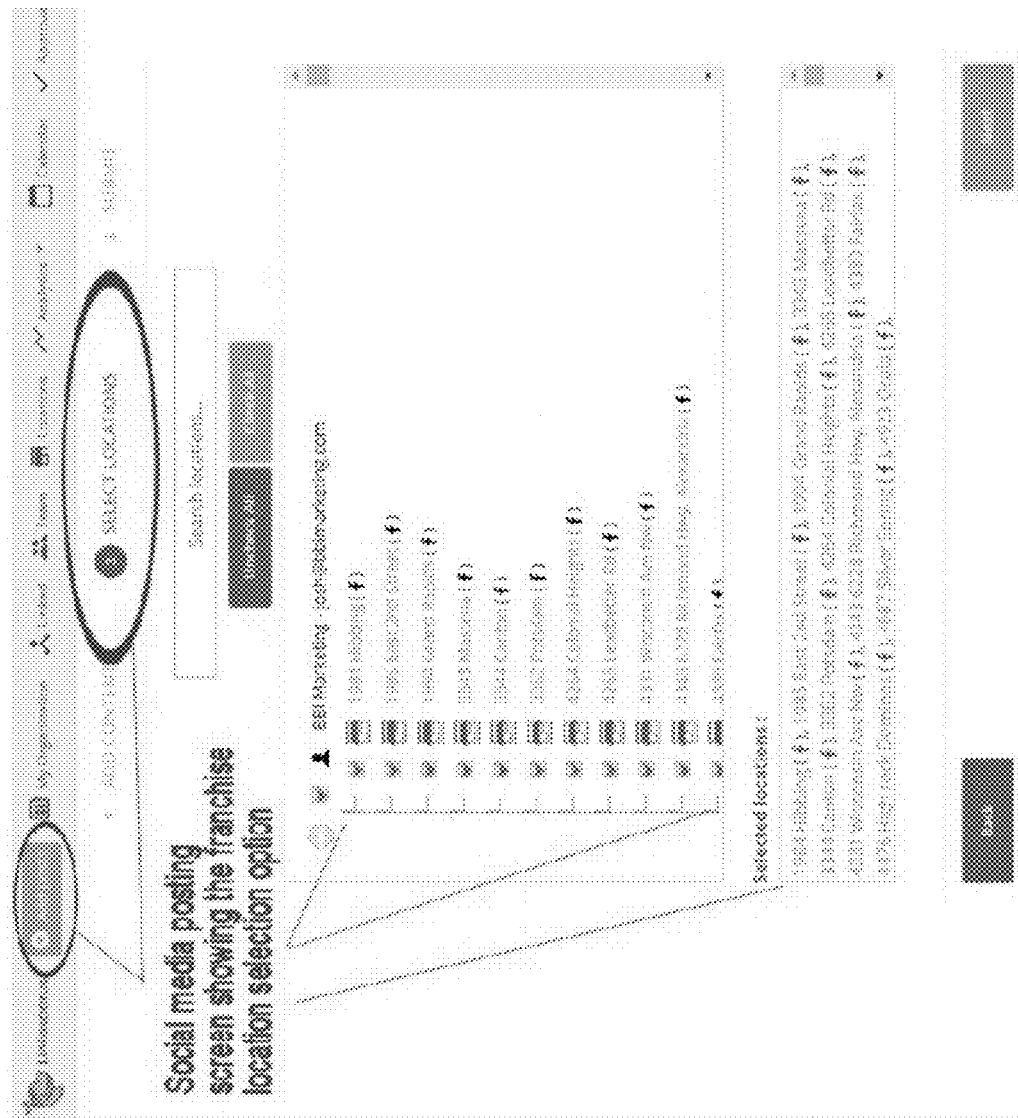
FIG. 19 is an exemplary screen shot.

In an exemplary embodiment, FIG. 19 is a screenshot of the "Add posts" portion of the software. The user is able to create new social media posts from the software in this portion of the software. This portion is a three step process where the user selects the content to add, selects the locations for the content to be posted, and submits the post. Adding new posts can also include the ability to schedule a date to publish.

Figure 20:
FIG. 20 is an exemplary screen shot.

In an exemplary embodiment, FIG. 20 shows a screenshot of a test publication in a Facebook account. The franchise unit location specific signature is shown as having been applied by the software according to the inventive concept.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A method of distributing content to consumers comprising the steps of:
   (a) providing a server loaded with a computer code comprising: an administrator user interface, a franchisor user interface, a franchisee user interface; a library of content accessible by an administrator, a franchisor, and/or one or more franchisees; and a consumer data bank;
   (b) linking the server with a plurality of social media platforms;
   (c) populating the library with a plurality of pieces of content;
   (d) linking one piece of content of the plurality of pieces of content to a franchise unit location and adding a location signature, associated with the franchise unit location, to the one piece of content;
   (e) publishing the one piece of content in one or more social media accounts of the plurality of social media platforms;
   (f) collecting consumer data for the one piece of content by the server and storing the consumer data in the consumer data bank;
   (g) wherein the franchisor and each franchisee has access to the library of content and to consumer data.

2. The method of claim 1 further comprising the step of linking the one piece of content with a second franchise unit location and adding a second location signature, associated with the second franchise unit location, to the one piece of content.

3. The method of claim 2 further comprising the step of providing the franchisor with authorization to link the one piece of content of the plurality of pieces of content to the franchise unit location, to add the location signature, associated with the franchise unit location, to the one piece of content, and to publish the one piece of content in one or more social media accounts of the plurality of social media platforms.

4. The method of claim 2 further comprising the step of providing one of the franchisees who controls the franchise unit location with authorization to link the one piece of content of the plurality of pieces of content to the franchise unit location, to add the location signature, associated with the franchise unit location, to the one piece of content, and to publish the one piece of content in one or more social media accounts of the plurality of social media platforms.

5. The method of claim 1 wherein when a franchisor publishes franchisor content to a franchisor social media account, the server links the franchisor content to each franchise unit location; adds the location signature, associated with the franchise unit location, to the franchisor content; and publishes the franchisor content in social media accounts associated with each franchise unit location.

6. The method of claim 5 wherein the franchisor content published in the social media accounts associated with each franchise unit location is published as original content.

7. The method of claim 1 wherein the plurality of social media platforms include one or more of: Facebook, Twitter, LinkedIn, Google+, Google My Business, YouTube, Pinterest, Instagram, Tumblr, Flickr, Reddit, Snapchat, WhatsApp, Quora, Vine, Periscope, Bizsugar, StumbleUpon, Delicious, Digg, Viber, Meetup, and VK.

8. The method of claim 1 wherein the franchisor comprises a plurality of franchisors and wherein each of the franchisees is associated with one franchisor of the plurality of franchisors.

9. The method of claim 1 wherein the franchisee user interface allows each franchisee to view: content in the library which the franchisee has published, content in the library which other franchisees have published, and content in the library which the franchisor has published; content in the library which the franchisee has scheduled to be published, content in the library which other franchisees have scheduled to be published, and content in the library which the franchisor has scheduled to be published; consumer data; and contact information for each of the franchisees.

10. The method of claim 9 wherein the consumer data comprises: an impression count, number of people view count, a like count, a comment count, and an interaction rate.

11. The method of claim 1 wherein the franchisee user interface allows each franchisee to filter the plurality of pieces of content in the library of content based on consumer data wherein the franchisee can select content to publish.

12. The method of claim 1 wherein the franchisee user interface allows each franchisee to reply to consumer comments on social media wherein a predetermined location signature is automatically added to the reply.

13. The method of claim 1 wherein the franchisor user interface allows the franchisor to link multiple franchise unit locations with a single franchisee.

14. The method of claim 1 wherein the franchisor user interface allows the franchisor to link multiple franchise unit locations with a single franchisee.

15. The method of claim 1 wherein the franchisee user interface allows the franchisees to link the one or more social media accounts to a particular franchise unit location.

16. The method of claim 1 wherein the franchisor user interface allows the franchisor to link one or more social media accounts to a particular franchise unit location.

17. The method of claim 1 wherein the franchisee user interface allows the franchisee to customize the location signature to correlate with a particular social media account.

18. The method of claim 1 wherein the franchisee user interface allows the franchisee to apply an organizational hierarchy of end users wherein the franchisee can control content available for end users to publish.

19. The method of claim 10 wherein the consumer data is viewable on an analytics hub by franchisors via the franchisor user interface and/or by franchisees via the franchisee user interface.

20. The method of claim 1 wherein when a first franchisee publishes a first franchisee content to a first franchisee social media account, the server links the first franchisee content to a second franchise unit location controlled by a second franchisee; replaces a first location signature with a second location signature, associated with the second franchise unit location; and publishes the first franchisor content in social media accounts associated with the second franchise unit location.

21. The method of claim 20 wherein the first franchisee content published in the social media accounts associated with the second franchise unit location is published as original content.

22. The method of claim 1, wherein the at least one source social media account is owned by a franchisee or a franchisor within a same franchise as an owner of the re-post social media account.

23. The method of claim 1 wherein the location signature, associated with the franchise unit location, comprises at least one of a physical location, a website, a printed periodical, a television or radio channel, a virtual location, an address, a phone number, an email, a social media linked business location, a Facebook linked location, a Google My Business linked location, a GPS associated link, or a hashtag associated with one or more of the preceding.

24. A method of distributing content to consumers comprising the steps of:
(a) providing a server loaded with a computer code comprising: a graphical user interface accessible by a user;
(b) linking the server with a plurality of social media platforms;
(c) allowing the user to create a customized location signature, associated with a franchise unit location;
(d) allowing the user to select at least one source social media account and at least one re-post social media account on at least one of the plurality of social media platforms;
(e) monitoring the at least one source social media account for new social media content;
(f) generating a re-post social media content by:
  (i) copying the new social media content;
  (ii) editing the new social media content to include the customized location signature;
  (iii) publishing the edited re-post social media content on the at least one re-post social media account; and
(g) repeating steps (e) and (f).

25. The method of claim 24 wherein the customized location signature, associated with the franchise unit location, comprises at least one of a physical location, a website, a printed periodical, a television or radio channel, a virtual location, an address, a phone number, an email, a social media linked business location, a Facebook linked location, a Google My Business linked location, a GPS associated link, or a hashtag associated with one or more of the preceding.

26. A method of distributing content to consumers comprising the steps of:
(a) providing a server loaded with a computer code comprising: a graphical user interface and a library of social media content and corresponding consumer data;
(b) providing access to the graphical user interface and library by an administrator, a franchisor, and/or one or more franchisees;
(c) linking the server with a plurality of social media platforms;
(d) populating the library with a plurality of social media content collected from preselected social media accounts on the plurality of social media platforms;
(e) selecting one piece of social media content from the library;
(f) generating a new social media content by adding a customized location signature, associated with a franchise unit location, to the one piece of social media content; and
(g) publishing the new social media content in one or more social media accounts of the plurality of social media platforms.

27. The method of claim 26 wherein the customized location signature, associated with the franchise unit location, comprises at least one of a physical location, a website, a printed periodical, a television or radio channel, a virtual location, an address, a phone number, an email, a social media linked business location, a Facebook linked location, a Google My Business linked location, a GPS associated link, or a hashtag associated with one or more of the preceding.

* * * * *